3,542,769
1-(4 - SUBSTITUTED PIPERIDINYLALKYL) - 5-PHENYL-DIHYDRO - 1,4-BENZODIAZEPINES AND BENZODIAZEPIN-2-ONES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Aug. 15, 1968, Ser. No. 752,743
Int. Cl. C07d 53/06
U.S. Cl. 260—239.3         10 Claims

ABSTRACT OF THE DISCLOSURE 1-(4-substituted piperidinylalkyl) - 5-phenyl - dihydro-1,4-benzodiazepines and benzodiazepin-2-ones in which the benzodiazepine nucleus may be halo, trifluoromethyl or nitro substituted and the piperidine ring is 4-hydroxy and 4-phenyl or 4-halo, methyl, methoxy or trifluoromethylphenyl substituted have useful neuroleptic and tranquilizing activity. The compounds are generally prepared by reaction of a 1-haloalkyl-5-phenyl-dihydro-1,4-benzodiazepine or benzodiazepin-2-one with a 4-phenyl-4-piperidinol. Also included are the dehydrated 1-(4-phenyl-1,2,5,6-tetrahydropyridyl) derivatives and the benzodiazepine 4-oxides.

This invention relates to novel 1-(4-substituted piperidinylalkyl) - 5-phenyl - dihydro-1,4-benzodiazepines and benzodiazepin-2-ones having useful pharmacodynamic activity. More specifically the compounds of this invention have neuroleptic and tranquilizing activity as demonstrated in standard animal pharmacological test procedures.

The compounds of this invention are represented by the following general structural formula:

FORMULA I

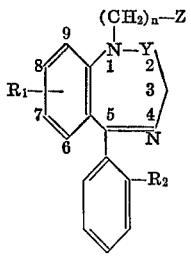

in which:

$n$ represents a positive whole integer of from 2 to 4;
$R_1$ represents hydrogen, chloro, bromo, fluoro, trifluoromethyl or nitro, preferably in position 7;
$R_2$ represents hydrogen or fluoro;
Y represents methylene or carbonyl;
Z represents

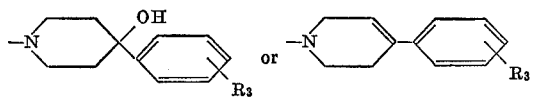

and $R_3$ represents hydrogen, chloro, bromo, fluoro, methyl, trifluoromethyl or methoxy.

Also included in this invention are the corresponding 4-oxides of the compounds in Formula I above.

Advantageous compounds are represented by the following formula:

FORMULA II

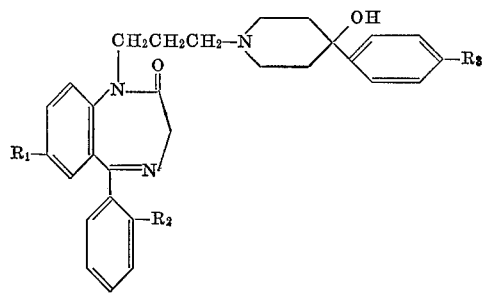

wherein $R_1$, $R_2$ and $R_3$ are as defined above.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

1-substituted-dihydro - 1,4-benzodiazepines and benzodiazepin-2-ones are known in the literature as for example in U.S. Pat. 3,299,053. The novelty of the compounds of this invention resides in the presence of the 4-substituted piperidinylalkyl substituent in the 1-position of the benzodiazepine ring system.

The compounds of Formula I above are generally prepared as shown in the following reaction:

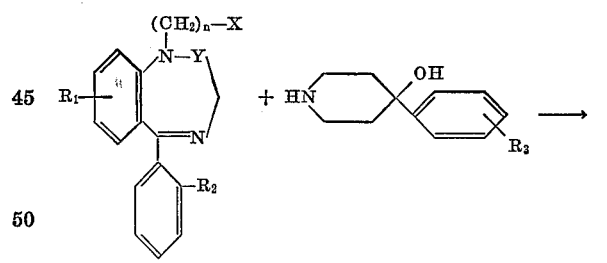

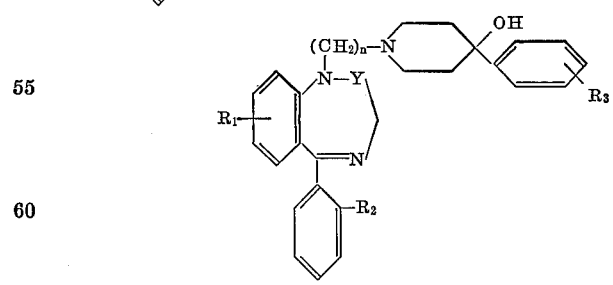

wherein $n$, Y, $R_1$, $R_2$ and $R_3$ are as defined for Formula I and X is halogen, preferably chlorine or bromine. As indicated above the 1-haloalkyl-dihydro-1,4-benzodiazepine or benzodiazepin-2-one is reacted with a 4-phenyl-4-piperidinol in an inert organic solvent such as 2-butanone, dimethylformamide or toluene, advantageously at the reflux temperature of the solvent for from 12 to 24 hours and in the presence of an alkali metal halide such as sodium iodide.

The corresponding 4-oxide of the 1-haloalkyl benzodiazepine starting materials shown above may be similarly employed to give the analogous 4-oxide products.

Compounds of Formula I in which Z is a 4-phenyl-1,2,5,6-tetrahydropyridyl moiety are prepared by dehydration of the corresponding 4-piperidinol products with, for example, refluxing concentrated hydrochloric acid. Alternatively a 4-phenyl-1,2,5,6-tetrahydropyridine may be used in the initial reaction instead of a 4-phenyl-4-piperidinol.

The 1-haloalkyl-dihydro-1,4-benzodiazepine and benzodiazepin-2-one starting materials are prepared by methods as described in U.S. Pat. 3,299,053.

The 4-phenyl-4-piperidinol starting materials used as described hereinabove are similarly known or prepared by methods known in the art.

Neuroleptic activity for compounds such as haloperidol is readily evaluated by the suppression of rage in mice. In this pharmacological procedure a test compound is administered orally to mice preselected for their ability to exhibit rage episodes during footshock and the animals are tested again. The percentage of animals exhibiting protection against rage is recorded. The compounds of this invention are approximately equipotent with haloperidol in this procedure.

A useful pharmacological indicator of tranquilizing activity for compounds such as chlordiazepoxide is the antagonism of Metrazol-induced convulsions in rats. In this procedure the compounds of this invention are approximately equipotent with chlordiazepoxide.

The following Table 1 sets forth data obtained in the above described test procedures for a preferred compound of this invention:

mixture is filtered and the filtrate concentrated in vacuo. The residue is dissolved in methylene chloride and the solution is water-washed, dried and concentrated to yield 7-chloro-1-[3-(4-hydroxy-4 - phenylpiperidinyl) - propyl]-1,3 - dihydro - 5-phenyl-2H-1,4-benzodiazepin-2-one, M.P. 126–128° C.

EXAMPLE 2

Following the procedure of Example 1, 3.32 g. of 7-chloro - 1 - (2 - chloroethyl)-1,3-dihydro-5-phenyl-2H-1,4-benzodiazepin-2-one is reacted with 0.02 mole of 4-phenyl-4-piperidinol to give 7-chloro-1-[2-(4-hydroxy-4-phenylpiperidinyl) - ethyl] - 1,3 - dihydro - 5 - phenyl - 2H - 1,4-benzodiazepin-2-one.

EXAMPLE 3

7 - chloro - 1 - (3 - chloropropyl) - 5-(2-fluorophenyl)-1,3-dihydro-2H-1,4-benzodiazepin-2-one (3.64 g.) is reacted with 0.02 mole of 4-phenyl-4-piperidinol as described in Example 1 to yield 7-chloro-1-[3-(4-hydroxy-4-phenylpiperidinyl) - propyl] - 5 - (2 - fluorophenyl) - 1,3-dihydro-2H-1,4-benzodiazepin-2-one.

Similar reaction with 7-chloro-1-(4-chlorobutyl)-5-(2-fluorophenyl)-1,3-dihydro-2H-1,4-benzodiazepin - 2 - one yields 7 - chloro - [4 - (4 - hydoxy - 4 - phenylpiperidinyl)-butyl] - 5 - (2-fluorophenyl) - 1,3 - dihydro - 2H - 1,4-benzodiazepin-2-one.

EXAMPLE 4

A mixture of 5.0 g. of 7-chloro-1-[3-(4-hydroxy-4-phenylpiperidinyl) - propyl] - 1,3 - dihydro-5-phenyl-2H-1,4-benzodiazepin-2-one hydrochloride and 100 ml. of concentrated hydrochloric acid is stirred for three hours on the steam bath and then allowed to stand overnight at room temperature. Methanol is added and the solution is evaporated in vacuo. The residue is dissolved in methanol, diluted with benzene and evaporated in vacuo. Benzene is added and the mixture evaporated in vacuo to give 7 - chloro - 1 - [3 - (4 - phenyl - 1,2,5,6 - tetrahydropyridyl) - propyl] - 1,3 - dihydro - 5 - phenyl - 2H - 1,4-

TABLE 1

| Compound | Mouse Rage | Metrazol Antagonism |
| --- | --- | --- |
| [structure: CH₂CH₂CH₂-N-piperidinyl-OH-phenyl attached to chloro-benzodiazepinone] | $ED_{50}$=5.5 mg./kg., oral | $ED_{50}$=4.3 mg./kg., oral. |

The compounds of this invention may be administered orally or parenterally in conventional dosage unit forms such as tablets, capsules, injectables or the like, by incorporating the appropriate dose of a compound of Formula I with carriers according to accepted pharmaceutical practices.

The foregoing is a general description of how to prepare the compounds of this invention. The following examples illustrate the preparation of specific compounds having neuroleptic and transquilizing activity. However this should not be construed as limiting the scope of the invention since appropriate variations in the starting materials will produce other corresponding products defined hereinabove.

EXAMPLE 1

A mixture of 3.47 g. (0.01) mole) of 7-chloro-1-(3-chloropropyl) - 1,3 - dihydro - 5 - phenyl-2H-1,4-benzodiazepin-2-one, 1.49 g. (0.01 mole) of sodium iodide and 3.54 g. (0.02 mole) of 4-phenyl-4-piperidinol in 30 ml. of 2-butanone is refluxed for 24 hours. The cooled reaction benzodiazepin-2-one hydrochloride. The free base is obtained in the usual manner.

Similarly, dehydration by the above procedure of other 4-piperidinol products of this invention yields the corresponding tetrahydropyridyl compounds.

EXAMPLE 5

Following the procedure of Example 1, 7-chloro-1-(3-chloropropyl) - 1,3 - dihydro - 5 - phenyl - 2H - 1,4 - benzodiazepin-2-one is reacted with 4-(p-chlorophenyl)-4-piperidinol to give the product, 7-chloro-1-[3-(4-hydroxy-4-p-chlorophenylpiperidinyl) - propyl] - 1,3 - dihydro - 5-phenyl-2H-1,4-benzodiazepin-2-one.

Similarly, use of 4-(p-tolyl)-4-piperidinol or 4-(p-trifluoromethylphenyl)-4-piperidinol as described above results in the formation of 7-chloro-1-[3-(4-hydroxy - 4-p-tolylpiperidinyl)-propyl]-1,3-dihydro - 5-phenyl - 2H-1,4-benzodiazepin-2-one or 7-chloro-1-[3-(4-hydroxy-4-p-trifluoromethylphenylpiperidinyl)-propyl] - 1,3-dihydro - 5-phenyl-2H - 1,4-benzodiazepin - 2-one, respectively.

Use of 4-(m-bromophenyl)-4-piperidinol or 4-(o-tolyl)-4-piperidinol in the above procedure results in the formation of 7-chloro-1-[3-(4-hydroxy - 4-m-bromophenyl piperidinyl)-propyl]-1,3-dihydro - 5-phenyl - 2H-1,4-benzodiazepin - 2-one or 7-chloro - 1-[3-(4-hydroxy-4-o-tolylpiperidinyl)-propyl] - 1,3-dihydro - 5-phenyl - 2H-1,4-benzodiazepin-2-one, respectively.

Use of fluoro or methoxy substituted phenyl piperidinols results in the formation of the corresponding fluoro or methoxy substituted phenyl products.

EXAMPLE 6

7-chloro - 1-(3-chloropropyl) - 5-phenyl - 1,3-dihydro-2H-1,4-benzodiazepin - 2-one 4-oxide (3.62 g.), prepared from the sodium salt of 7-chloro - 5-phenyl - 1,3-dihydro-2H - 1,4-benzodiazepin - 2-one 4-oxide and 1-bromo-3-chloropropane, is reacted with 0.02 mole of 4-phenyl-4-piperidinol as described in Example 1 to give 7-chloro-1-[3-(4-hydroxy - 4-phenylpiperidinyl)-propyl]-5-phenyl - 1,3-dihydro - 2H - 1,4-benzodiazepin - 2-one 4-oxide.

EXAMPLE 7

Following the procedure of Example 1, 7-nitro-1-(3-chloropropyl) - 5-phenyl - 1,3-dihydro - 2H-1,4-benzodiazepin - 2-one is reatced with 4-phenyl - 4-piperidinol to give the product, 7-nitro-1-[3-(4-hydroxy - 4-phenylpiperidinyl)-propyl]-5-phenyl - 1,3-dihydro-2H-1,4-benzodiazepin-2-one.

Similarly, use of 7-trifluoromethyl - 1-(3-chloropropyl)-5-phenyl - 1,3-dihydro - 2H-1,4-benzodiazepin - 2-one as described above results in the formation of 7-trifluoromethyl - 1-[3-(4-hydroxy - 4-phenylpiperidinyl)-propyl]-5-phenyl - 1,3-dihydro - 2H - 1,4-benzodiazepin - 2-one. Use of 7-bromo - 1-(3-chloropropyl) - 5-phenyl-1,3-dihydro - 2H-1,4-benzodiazepin - 2-one results in the formation of 7-bromo-1-[3-(4-hydroxy - 4-phenylpiperidinyl)-propyl]-5-phenyl - 1,3-dihydro - 2H-1,4-benzodiazepin-2-one.

EXAMPLE 8

7-trifluoromethyl - 1-(3-chloropropyl) - 5-phenyl - 2,3-dihydro - 1H-1,4-benzodiazepine (0.01 mole), prepared from the sodium salt of 7-trifluoromethyl - 5-phenyl-2,3-dihydro - 1H-1,4-benzodiazepine and 1-bromo-3-chloropropane, is reacted with 0.02 mole of 4-phenyl-4-piperidinol as described in Example 1 to give 7-trifluoromethyl-1-[3-(4-hydroxy - 4-phenylpiperidinyl)-propyl]-5-phenyl-2,3-dihydro - 1H-1,4-benzodiazepine.

What is claimed is:
1. A chemical compound of the formula:

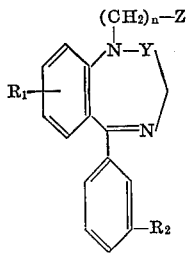

and the corresponding 4-oxide or a pharmaceutically acceptable acid addition salt thereof, wherein:

$n$ is a positive integer from 2 to 4;
$R_1$ is hydrogen, chloro, bromo, fluoro, trifluoromethyl or nitro;
$R_2$ is hydrogen or fluoro;
$Y$ is methylene or carbonyl;

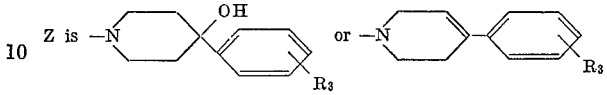

and
$R_3$ is hydrogen, chloro, bromo, fluoro, methyl, trifluoromethyl or methoxy.

2. A 4-desoxy chemical compound of claim 1.
3. A chemical compound according to claim 2 in which $Y$ is carbonyl and $Z$ is

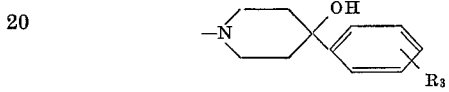

4. A chemical compound according to claim 3 in which $n$ is 3, $R_1$ is in the 7-position and $R_3$ is in the 4-phenyl position.
5. A chemical compound according to claim 4 in which $R_1$ is chloro.
6. A chemical compound according to claim 5 in which $R_2$ is hydrogen.
7. A chemical compound according to claim 6 in which $R_3$ is hydrogen, being the compound 7-chloro-1-[3-(4-hydroxy - 4-phenylpiperidinyl)-propyl]-1,3-dihydro-5-phenyl - 2H-1,4-benzodiazepin - 2-one.
8. A chemical compound according to claim 6 in which $R_3$ is chloro, being the compound 7-chloro - 1-[3-(4-hydroxy - 4-p-chlorophenylpiperidinyl)-propyl] - 1,3-dihydro - 5-phenyl - 2H-1,4-benzodiazepin - 2-one.
9. A chemical compound according to claim 5 in which $R_2$ is fluoro and $R_3$ is hydrogen, being the compound 7-chloro - 1-[3-(4-hydroxy - 4 - phenylpiperidinyl)-propyl]-5-(2-fluorophenyl) - 1,3-dihydro-2H-1,4-benzodiazepin-2-one.
10. A chemical compound according to claim 4 in which $R_1$ is trifluoromethyl and $R_2$ and $R_3$ are hydrogen, being the compound 7-trifluoromethyl - 1-[3-(4-hydroxy-4-phenylpiperidinyl)-propyl]-5-phenyl - 1,3-dihydro - 2H-1,4-benzodiazepin - 2-one.

References Cited

UNITED STATES PATENTS 3,475,414   10/1969   Havera _____ 260—239.3

HENRY R. JILES, Primary Examiner
R. T. BOND, Assistant Examiner

U.S. Cl. X.R.

260—239, 294.7, 296; 424—244, 263, 267

PO-1050
(5/69)

UNITED STATES PATENT OFFICE
CERTIFICATE OF CORRECTION

Patent No. 3,542,769                Dated November 24, 1970

Inventor(s) Carl Kaiser and Charles L. Zirkle

It is certified that error appears in the above-identified patent and that said Letters Patent are hereby corrected as shown below:

Column 5, lines 55 to 60, that portion of the formula reading

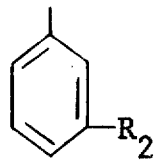    should read    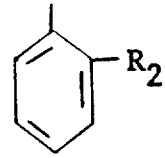

FEB. 9, 1971

(SEAL)
Attest:

Edward M. Fletcher, Jr.
Attesting Officer

WILLIAM E. SCHUYLER, JR.
Commissioner of Patents